United States Patent
De Filippo

[11] Patent Number: 6,056,358
[45] Date of Patent: May 2, 2000

[54] HEAD-REST FOR A CAR SEAT

[75] Inventor: Emilio De Filippo, Bruzolo, Italy

[73] Assignee: Gestind M.B. Manifattura Di Bruzolo S.p.A., Bruzolo, Italy

[21] Appl. No.: 09/201,909

[22] Filed: Nov. 30, 1998

[30] Foreign Application Priority Data

Nov. 28, 1997 [IT] Italy .................................. TO97U0232

[51] Int. Cl.⁷ ..................................................... A61G 15/00

[52] U.S. Cl. ........................................... 297/220; 297/391

[58] Field of Search ..................... 297/220, 391; 5/692

[56] References Cited

U.S. PATENT DOCUMENTS

| | | | |
|---|---|---|---|
| 5,261,726 | 11/1993 | Yanagishita | 297/391 |
| 5,405,190 | 4/1995 | Jeffcoat et al. | 297/391 |
| 5,664,840 | 9/1997 | Stenzel | 297/220 X |
| 5,820,222 | 10/1998 | De Filippo | 297/220 |

Primary Examiner—Anthony D. Barfield
Attorney, Agent, or Firm—Shlesinger, Arkwright & Garvey LLP

[57] ABSTRACT

A head-rest for a car seat including a body of expanded plastics material and a covering layer applied to the body. The covering layer covers only a front portion of the body and is fixed thereto by forcible insertion of at least one perimetral edge directly into at least one corresponding annular slit in the body.

14 Claims, 2 Drawing Sheets

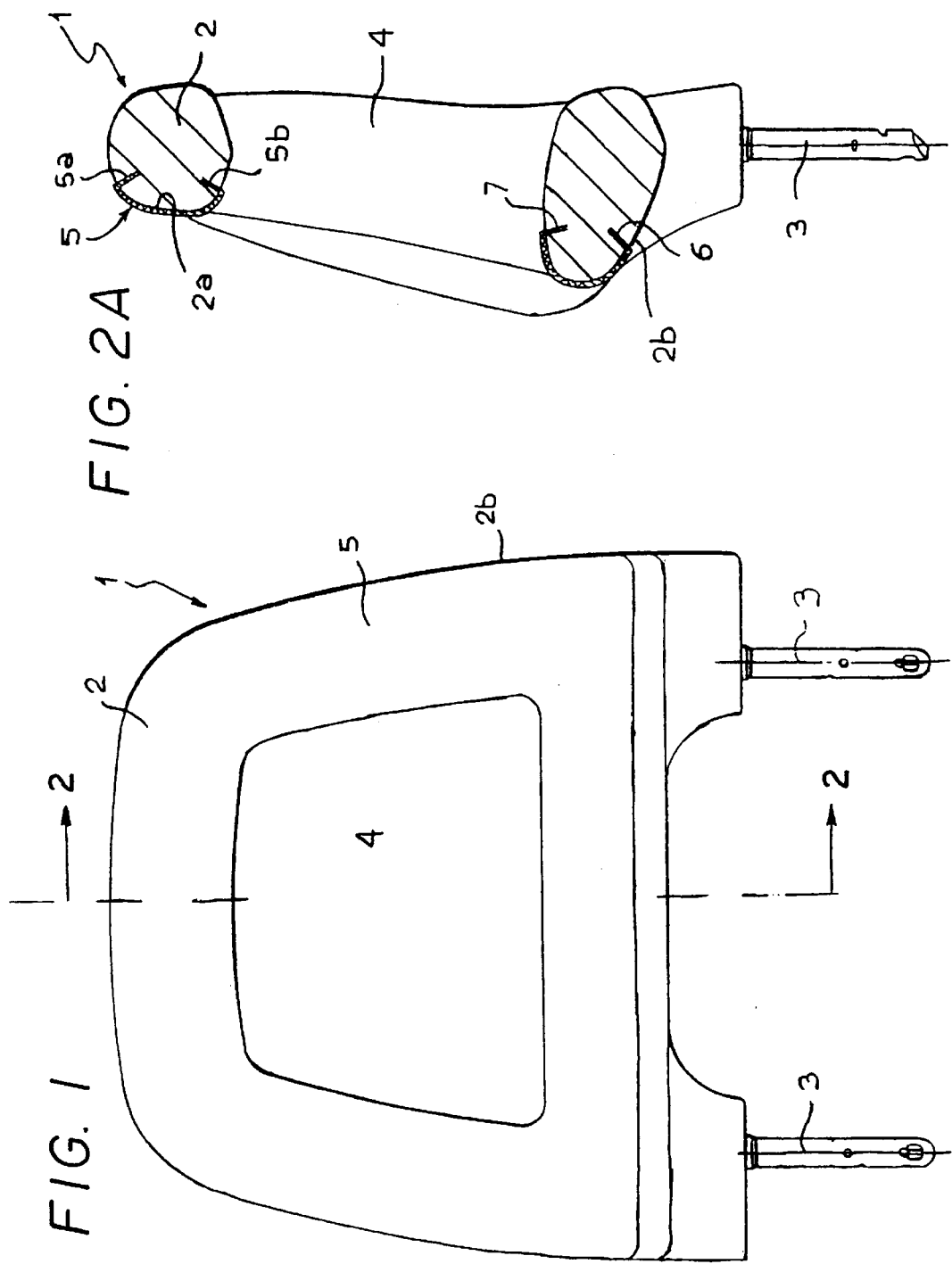

HEAD-REST FOR A CAR SEAT

BACKGROUND OF THE INVENTION

The present invention relates to a head-rest for a car seat, which comprises a body of expanded plastics material with two parallel support rods protruding therefrom and a covering layer applied thereto.

In prior art head-rests of this type, the covering layer, usually a textile, entirely covers the expanded plastics body, essential for aesthetic purposes. In such arrangements, it normally proves difficult and costly to solve the various technical problems involved in securing the covering layer to the body of expanded plastics material.

In some arrangements the covering layer is not applied directly to the expanded plastics body but fixed to a cushion element which is then applied to the body of the head-rest. However, although aesthetically pleasing, such arrangements involve the same disadvantages cited above.

SUMMARY OF THE INVENTION

The object of the present invention is to overcome the aforesaid disadvantages, and this is achieved, essentially, by virtue of the fact that the layer covers only a front portion of the head-rest body and is fixed thereto by forcibly inserting at least one perimetral edge thereof directly into a corresponding annular slit in the body.

Thanks to this arrangement of the invention, the covering layer is easy and simple to apply, and requires no additional retaining members. In fact, once the covering layer has been fitted, by using a simple blade tool to insert the edge of the cover into the annular slit in the body, it is reliably secured by the resilient tightening action of the opposing walls of the annular slit in the body against the portion of cover inserted therein.

In order to secure the covering layer even more securely to the body, the annular slit is heavily inclined to the surface of the said front portion of the body of the head-rest.

In a preferred embodiment of the invention, in which the body is of annular shape, the covering layer is also of annular shape with its outer perimetral edge and its inner perimetral edge engaged respectively in an outer annular slit and an inner annular slit in the body. These annular slits can be formed in either the front surface or the lateral surface of the body of the head-rest.

In order further to secure the covering layer to the body, the said covering layer can also be glued to the said front portion of the body.

BRIEF DESCRIPTION OF THE DRAWINGS

FIG. 1 is a front elevational view of a head rest for a car seat made in accordance with the present invention.

FIG. 2A is a cross-sectional view taken along line 2—2 of FIG. 1, showing the slits formed in the lateral surface of the front portion of the head-rest.

DETAILED DESCRIPTION OF THE INVENTION

Figure 2B:
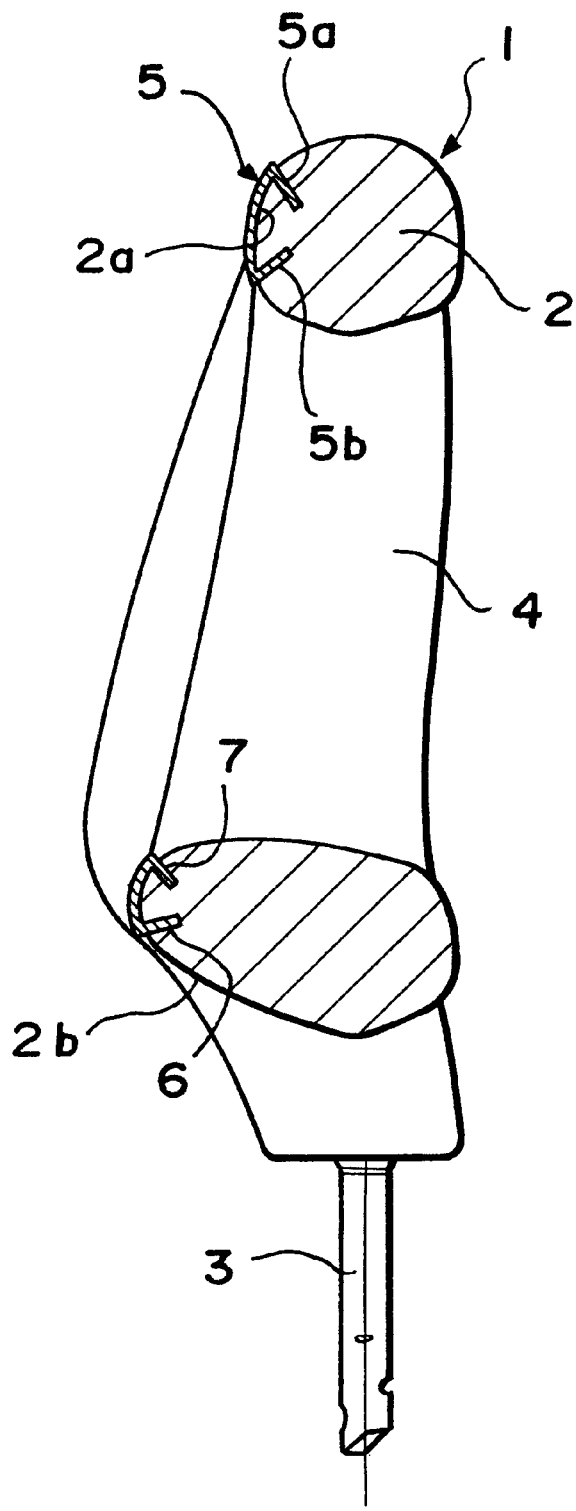
FIG. 2B is a cross-sectional view taken along line 2—2, showing the slits formed in the front surface of the front portion of the head-rest.

In the drawings, a head-rest for a car seat is generally indicated 1 and essentially comprises a body of expanded plastics material 2 incorporating a supporting framework, generally of a rigid moulded plastics material, which is not shown in the drawings for reasons of simplicity. This support framework is fixed to a pair of support rods 3 projecting from the base of the head-rest 1 and operable to connect it to the back of a car seat, and possibly to adjust the height and inclination.

In the case of the embodiment illustrated, the body 2 has an annular shape, defining, that is, a central aperture 4 through the head-rest 1. Naturally this configuration is suggested purely by way of non-limitative example, since the scope of the invention extends to a case in which the body 2 is not annular.

A covering textile is indicated 5 and, in accordance with the invention, covers only a front portion of the head-rest 1. In the case of the example illustrated, this front portion comprises a front surface 2a and an adjacent lateral surface 2b, both surfaces naturally being annular. Alternatively, the front portion of the body 2 covered with the textile 5 could consist only of the front surface 2a.

The covering layer 5 is secured to the body 2 by forcibly inserting the outer perimetral edge 5a and the inner perimetral edge 2b directly into an outer annular slit 6, and an inner annular slit 7 of the body 2 respectively. In the example illustrated, in which, as stated, the covering textile 5 covers both the front surface 2a and the adjacent lateral surface 2b of the body 2, the annular slits 6 and 7 are of course, formed along the lateral surface 2b, as best shown in FIG. 2A. Alternatively, that is if the covering textile covered only the front surface 2a, the slits 6 and 7 would be formed in the front portion 2a, as best shown in FIG. 2B.

In order to ensure that the perimetral edges 5a and 5b are secure, the slits 6, 7 are seen in cross section to be heavily inclined to the surface of the front portion of the body covered with the said material 5.

In assembly, the perimetral edges 5a and 5b are forcibly inserted into respective slits by means of a tool with a thin blade. It follows that this operation can be carried out easily, quickly and at low cost.

Once the perimetral edges 5a and 5b of the material 5 are inserted, they are gripped resiliently between the walls of the body 2 which, of course, define the annular slits 6 and 7.

In order to make it impossible to detach the material 5, this can also be glued to the surface of the body 2 by means of a layer of a suitable adhesive.

In order to give the head-rest 1 a particularly attractive appearance, the covering textile 5 and the outer surface of the body 2 could be of different, contrasting colours.

The scope of the invention naturally extends to other embodiments using the same innovative concept for an equivalent purpose.

What is claimed is:

1. A head-rest for a car seat, comprising:
   a) a body of expanded plastic material;
   b) a covering layer applied to a front portion of said body;
   c) said body including an annular slit forming opposing walls; and
   d) said covering layer including a perimetral edge inserted into said slit such that said opposing walls grip said perimetral edge.

2. A head-rest as in claim 1, wherein:
   a) said perimetral edge is resiliently gripped by said walls.

3. A head-rest as in claim 1, wherein:
   a) said annular slit is inclined with respect to a front surface of said front portion.

4. A head-rest as in claim 1, wherein:
a) said front portion includes front and lateral surfaces; and
b) said slit is disposed on said front surface.

5. A head-rest as in claim 1, wherein:
a) said front portion includes front and lateral surfaces; and
b) said slit is disposed on said lateral surface.

6. A head-rest as in claim 1, wherein:
a) said layer covering is glued to said front portion.

7. A head-rest as in claim 1, wherein:
a) said layer covering is textile fabric.

8. A head-rest for a car seat, comprising:
a) an annular shaped body of expanded plastic material;
b) an annular shaped covering layer applied to a front portion of said body;
c) said body including annular outer and inner slits, each forming opposing walls; and
d) said covering layer including outer and inner perimetral edges, each inserted into respective said outer and inner slits such that said opposing walls grip said perimetral edges.

9. A head-rest as in claim 8, wherein:
a) said outer and inner perimetral edges are resiliently gripped by said walls.

10. A head-rest as in claim 8, wherein:
a) each of said outer and inner annular slits is inclined with respect to a front surface of said front portion.

11. A head-rest as in claim 8, wherein:
a) said front portion includes front and lateral surfaces; and
b) said outer and inner annular slits are disposed on said front surface.

12. A head-rest as in claim 8, wherein:
a) said front portion includes front and lateral surfaces; and
b) said outer and inner annular slits are disposed on said lateral surface.

13. A head-rest as in claim 8, wherein:
a) said layer covering is glued to said front portion.

14. A head-rest as in claim 8, wherein:
a) said layer covering is textile fabric.

* * * * *